US012759643B2

(12) United States Patent
Zarpelon et al.

(10) Patent No.: US 12,759,643 B2
(45) Date of Patent: Oct. 13, 2026

(54) FENDER SUSPENSION ARRANGEMENT

(71) Applicant: Volvo Truck Corporation, Gothenburg (SE)

(72) Inventors: Fernando Luis Zarpelon, Curitiba (BR); Mauro Alvarenga, Curitiba (BR); Alessandro Pereira, Curitiba (BR)

(73) Assignee: Volvo Truck Corporation, Gothenburg (SE)

( * ) Notice: Subject to any disclaimer, the term of this patent is extended or adjusted under 35 U.S.C. 154(b) by 283 days.

(21) Appl. No.: 18/616,346

(22) Filed: Mar. 26, 2024

(65) Prior Publication Data

US 2024/0336307 A1 Oct. 10, 2024

(30) Foreign Application Priority Data

Apr. 4, 2023 (EP) .................................... 23166427

(51) Int. Cl.
*B62D 25/16* (2006.01)

(52) U.S. Cl.
CPC .................................. *B62D 25/163* (2013.01)

(58) Field of Classification Search
CPC .................................................... B62D 25/163
See application file for complete search history.

(56) References Cited

U.S. PATENT DOCUMENTS 4,377,294 A * 3/1983 Lockwood ............ B62D 25/16 411/401
4,627,594 A * 12/1986 Reed .................... B62D 25/188 248/632
4,735,428 A * 4/1988 Antekeier ............ B62D 25/188 280/154
6,073,947 A * 6/2000 Gottschalk ............. B62D 17/00 280/124.157
2002/0024213 A1* 2/2002 Hawes ................. B62D 25/168 280/847
2004/0004351 A1* 1/2004 Hawes ................. B62D 25/168 280/851

(Continued)

FOREIGN PATENT DOCUMENTS

IT 202100000416 A1 7/2022
SE 540124 C2 4/2018

OTHER PUBLICATIONS

Examination Report for European Patent Application No. 23166427.7, mailed Oct. 9, 2025, 5 pages.

(Continued)

*Primary Examiner* — Brian L Swenson

(74) *Attorney, Agent, or Firm* — Withrow & Terranova, PLLC

(57) ABSTRACT

A fender suspension arrangement for suspending a fender of a vehicle, the fender suspension arrangement comprising a bracket, connectable to a frame of the vehicle, an elongated tube attached to the bracket, a pair of fender brackets connectable to the fender of the vehicle, wherein the fender brackets are attached to the elongated tube at a distance from each other, and an elongated washer element, arranged in abutment with the elongated tube, the elongated washer element extending between, and being connected to, the bracket and at least one of the fender brackets.

19 Claims, 3 Drawing Sheets

(56) References Cited

U.S. PATENT DOCUMENTS

| | | | | |
|---|---|---|---|---|
| 2005/0167972 | A1* | 8/2005 | Hawes | B62D 25/168 280/854 |
| 2008/0029989 | A1* | 2/2008 | Griffiths | B62D 25/163 280/154 |
| 2013/0313389 | A1* | 11/2013 | Lodi | B62D 25/16 248/214 |
| 2016/0001821 | A1* | 1/2016 | Denu | B62D 25/166 280/154 |
| 2022/0041224 | A1* | 2/2022 | Flores | B62D 25/168 |
| 2022/0177043 | A1* | 6/2022 | Bowen | B62D 25/163 |
| 2022/0363319 | A1* | 11/2022 | Grant | B60B 7/04 |

OTHER PUBLICATIONS

Extended European Search Report for European Patent Application No. 23166427.7, mailed Aug. 25, 2023, 5 pages.

* cited by examiner

FENDER SUSPENSION ARRANGEMENT

PRIORITY APPLICATIONS

The present application claims priority to European Patent Application No. 23166427.7, filed on Apr. 4, 2023, and entitled "FENDER SUSPENSION ARRANGEMENT," which is incorporated herein by reference in its entirety.

TECHNICAL FIELD

The disclosure relates generally to fenders of vehicles. In particular aspects, the disclosure relates to a fender suspension arrangement for suspending a fender of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Heavy duty vehicles operate in a wide variety of conditions. Components of the vehicle can be exposed to fatigue failure due to stress concentrations caused by the e.g. bumpy and harsh road conditions. The fenders are one vehicle component that may be damaged when operating the vehicle in such harsh conditions. In particular, the bracket and/or the stay suspending the fender may be a component that is sensitive to stresses caused by operation in bumpy conditions.

There is thus a desire to improve the suspension of fenders to reduce the risk that fenders are detached during operation.

SUMMARY

According to a first aspect of the disclosure, there is provided fender suspension arrangement for suspending a fender of a vehicle, the fender suspension arrangement comprising a bracket, connectable to a frame of the vehicle, an elongated tube attached to the bracket, a pair of fender brackets connectable to the fender of the vehicle, wherein the fender brackets are attached to the elongated tube at a distance from each other, and an elongated washer element, arranged in abutment with the elongated tube, the elongated washer element extending between, and being connected to, the bracket and at least one of the fender brackets. The first aspect of the disclosure may seek to at least partly alleviate the above described problems of detaching fenders. By providing the elongated washer element to be connected to the bracket as well as to the fender bracket, a technical benefit may include that the fender can be kept attached to the vehicle when a crack appears on the bracket and/or the elongated tube connected to the bracket. Hence, the fender suspension arrangement provides for a robust arrangement that can prevent detachment of fenders even in rough operating conditions.

Optionally, in some examples, including in at least one preferred example, the elongated washer element may be connected to the fender bracket, of the pair of fender brackets, positioned closest to the bracket. The portion of the elongated tube connected closest to the bracket may be particularly exposed to fatigue and a technical benefit may thus include that the risk of fender detachment is further reduced.

Optionally, in some examples, including in at least one preferred example, the elongated washer element may be arranged inside the elongated tube and connected to the bracket and the at least one fender bracket via the elongated tube. A technical benefit may include that the elongated washer element does not intervene with existing connecting elements and design, while still serving the purpose of increasing the stiffness of the interface between the elongated tube and the bracket.

Optionally, in some examples, including in at least one preferred example, the fender suspension arrangement may comprise at least one bracket bolt, the at least one bracket bolt fixating the elongated tube and the elongated washer element to the bracket. Optionally, in some examples, including in at least one preferred example, the fender suspension arrangement may comprise a pair of bracket bolts fixating the elongated tube and the elongated washer element to the bracket. A technical benefit may include that the elongated washer element is safely fixated to the bracket as well as to the elongated tube.

Optionally, in some examples, including in at least one preferred example, the at least bracket bolt may extend through the bracket, the elongated washer element and the elongated tube, the at least one bracket bolt comprising a longitudinal end portion positioned inside the elongated tube. A technical benefit may include that the end portion is hidden in the elongated tube and the risk of interacting with other vehicle components is reduced.

Optionally, in some examples, including in at least one preferred example, the fender suspension arrangement may comprise a fender bracket bolt, the fender bracket bolt fixating the elongated tube and the elongated washer element to the at least one fender bracket. A technical benefit may include that the elongated washer element is safely fixated to the at least one fender bracket as well as to the elongated tube.

Optionally, in some examples, including in at least one preferred example, the fender bracket bolt may extend through the at least one fender bracket, the elongated washer element and the elongated tube.

Optionally, in some examples, including in at least one preferred example, the at least one fender bracket may comprise two surface portions arranged in abutment with the elongated tube, the two surface portions being arranged on opposite sides of the elongated tube in a direction perpendicular to the extension of the elongated tube. A technical benefit may include that the installation of the elongated tube to the fender bracket can be simplified since the elongated tube can be arranged in the area formed by the two surface portions before fixating the elongated tube and the fender bracket to each other.

Optionally, in some examples, including in at least one preferred example, the fender bracket bolt may extend through each of the two surface portions of the fender bracket. A technical benefit may include the final fixation of a nut connected to the fender bracket bolt can be simplified.

Optionally, in some examples, including in at least one preferred example, the elongated tube may comprise a first longitudinal end portion attached to, and extends from, the bracket, and second longitudinal end portion arranged longitudinally opposite to the first longitudinal end portion.

Optionally, in some examples, including in at least one preferred example, one fender bracket of the pair of fender brackets may be arranged in the vicinity of the bracket, and the other fender bracket if the pair of fender brackets is arranged in the vicinity of the second longitudinal end portion. By arranging the fender brackets at a distance from each other may have the technical benefit of providing for a sufficient stiffness of the elongated tube.

Optionally, in some examples, including in at least one preferred example, the pair of fender brackets may each comprise an elongated fender connection surface extending from, and in a direction perpendicular to, the elongated tube, wherein each of the elongated fender connection surfaces comprises at least one connector element configured to connect the fender to the fender bracket. A technical benefit may include that the fender can be sufficiently attached to the fender brackets.

Optionally, in some examples, including in at least one preferred example, the elongated tube may comprise a rectangular cross section. Optionally, in some examples, including in at least one preferred example, the cross section may be quadratic.

Optionally, in some examples, including in at least one preferred example, the bracket may be formed by cast iron. A technical benefit may include that a high strength bracket is provided.

Optionally, in some examples, including in at least one preferred example, the elongated tube is made of a metallic material. Optionally, in some examples, including in at least one preferred example, the elongated washer element may be made of a metallic material. A technical benefit may include that the elongated tube as well as the elongated washer element is able to handle high stress concentrations.

According to a second aspect, there is provided a fender arrangement comprising a fender and a fender suspension arrangement according to any one of the examples given above in relation to the first aspect, wherein the fender is attached to the pair of fender brackets.

According to a third aspect, there is provided a vehicle, comprising a vehicle frame and a fender arrangement according to the above described second aspect, wherein the bracket is attached to the vehicle frame.

Effect and features of the second and third aspects are largely analogous to the effects and features described above in relation to the first aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The disclosure described in the following may seek to mitigate the problem of fender detachment, especially for vehicles driving at harsh operating conditions. A technical benefit may thus include that a fender suspension with increased stiffness is provided.

Figure 1:
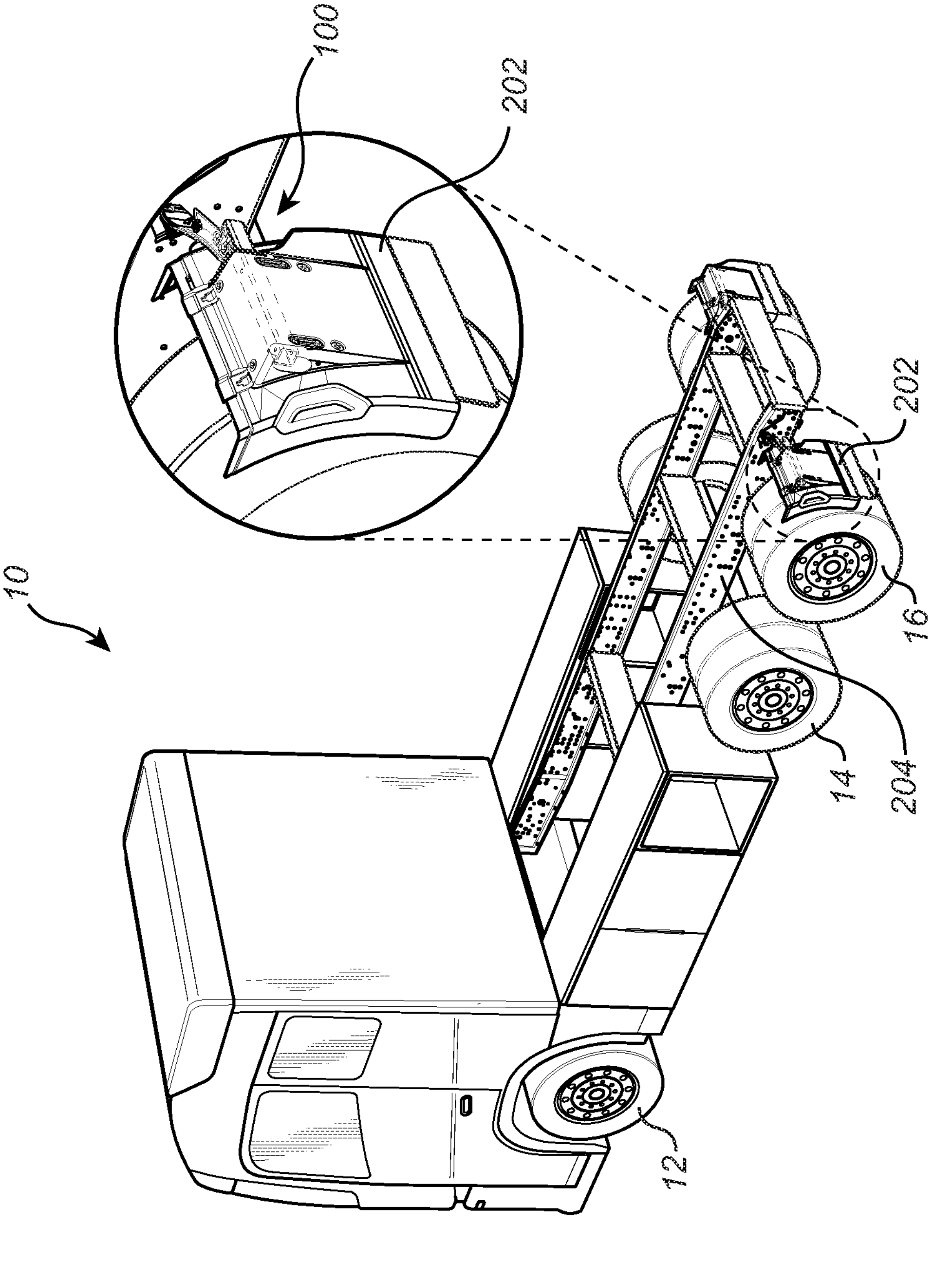
FIG. 1 is an exemplary illustration of a vehicle in the form of a truck according to an example.

Initial reference is made to FIG. 1 which is an exemplary illustration of a vehicle 10 in the form of a truck according to an example. The exemplified vehicle 10 comprises a pair of front steerable wheels 12, a first pair of rear wheels 14 and a second pair of rear wheels 16, where the second pair of rear wheels 16 are arranged behind the first pair of rear wheels 14 as seen in a forward driving direction of the vehicle 10. Further, the vehicle 10 comprises a frame 204, which is exemplified as comprising a pair of longitudinally extending frame rails. Further, and as illustrated in FIG. 1, the vehicle 10 comprises a fender 202 arranged to e.g. prevent dirt to spread uncontrollably behind, or on, the vehicle 10. The fender 202 is attached to the frame 204 of the vehicle 10 by a fender suspension arrangement 100. The exemplified fender 202 and fender suspension arrangement 100 are depicted as arranged rearwardly of the second pair of rear wheels 16. However, the fender 202 and the fender suspension arrangement 100 may be arranged behind any of the pair of wheels of the vehicle 10. Also, the vehicle 10 may comprise a trailer (not shown) and/or a dolly (not shown), where the fender 202 and fender suspension arrangement 100 are arranged rearward of the pair of wheels of such trailer and/or dolly. Thus, the disclosure described in the following should not be construed as limited to a fender 202 and fender suspension arrangement 100 arranged behind the second pair of rear wheels 16 as depicted in FIG. 1. In other words, the example in FIG. 1 is merely for illustrative purposes.

Figure 2:
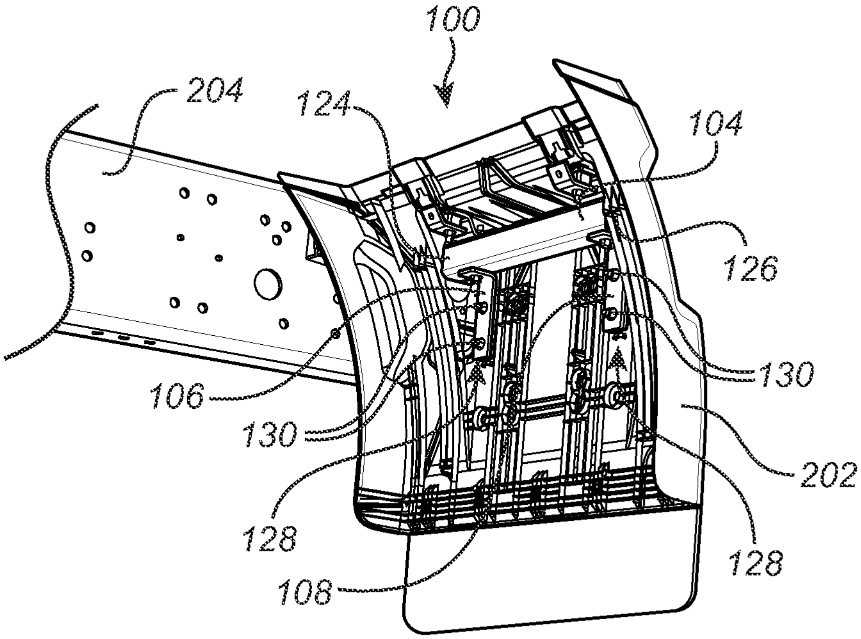
FIG. 2 is an exemplary perspective view of a fender and a fender suspension arrangement according to an example.

In order to describe the fender suspension arrangement 100 in further detail, reference is now made to FIG. 2 which is an exemplary perspective view of the fender 202 and the fender suspension arrangement 100 according to an example. As indicated above, the fender 202 is connected to the frame 204 of the vehicle by the fender suspension arrangement 100. In further detail, and as illustrated in FIG. 2, the fender suspension arrangement 100 comprises an elongated tube 104 onto which a pair of fender brackets 106, 108 are attached. The elongated tube 104 comprises a first longitudinal end portion 124 attached to, and extends from, a bracket (see 102 in FIGS. 2 and 3), and second longitudinal end portion 126 arranged longitudinally opposite to the first longitudinal end portion 124. Further details of the attachments of the pair of fender brackets 106, 108 to the elongated tube 104 will be given below in relation to the description of FIGS. 3 and 4.

As also illustrated in FIG. 2, the pair of fender brackets 106, 108 each comprises an elongated fender connection surface 128 extending from, and in a direction perpendicular to, the elongated tube 104. The fender 202 is attached to the pair of fender brackets 106, 108 by at least one connector element 130 arranged on the elongated fender connection surface 128. In the example depicted in FIG. 2, the fender 202 is attached to a first fender bracket 106 of the pair fender brackets by a pair of connector elements 130. In a similar vein, the fender 202 is also attached to a second fender bracket 108 of the pair of fender brackets by a pair of connector elements 130. The connector elements 130 may be a respective screw and nut connector element, a bolt connector element, a rivet connector element, etc.

Further, the elongated tube comprises a rectangular cross section, and as illustrated in FIG. 2, the rectangular cross section may be quadratic. Also, the elongated tube 104 as well as each of the pair of fender brackets 106, 108 are preferably made of a metallic material, such as e.g. steel, aluminum, etc. The fender 202 is conventionally produced by a plastic material.

Figure 3:
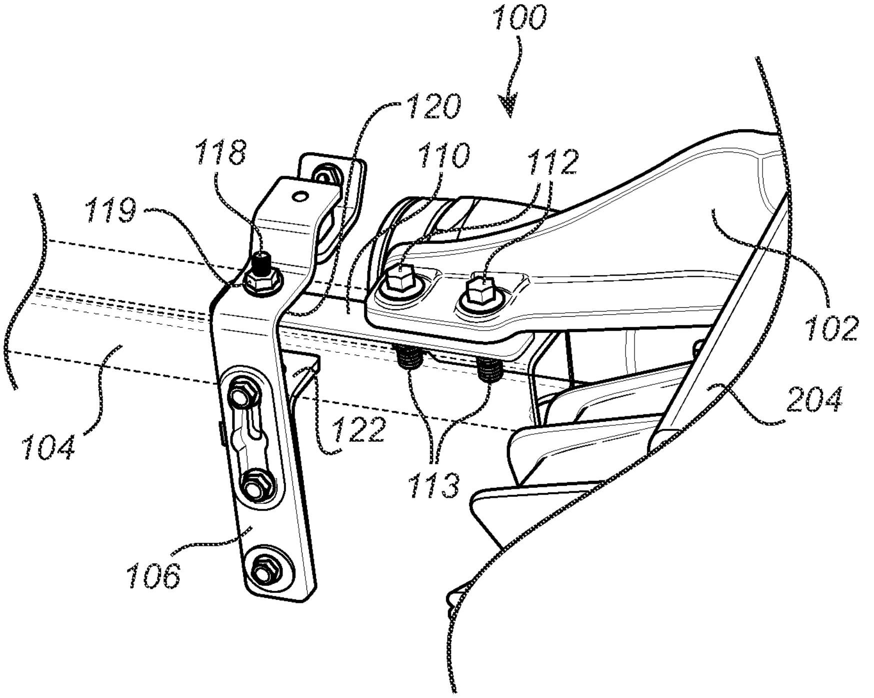
FIGS. 3 and 4 are exemplary detailed illustrations of the fender suspension arrangement according to an example.
Figure 4:
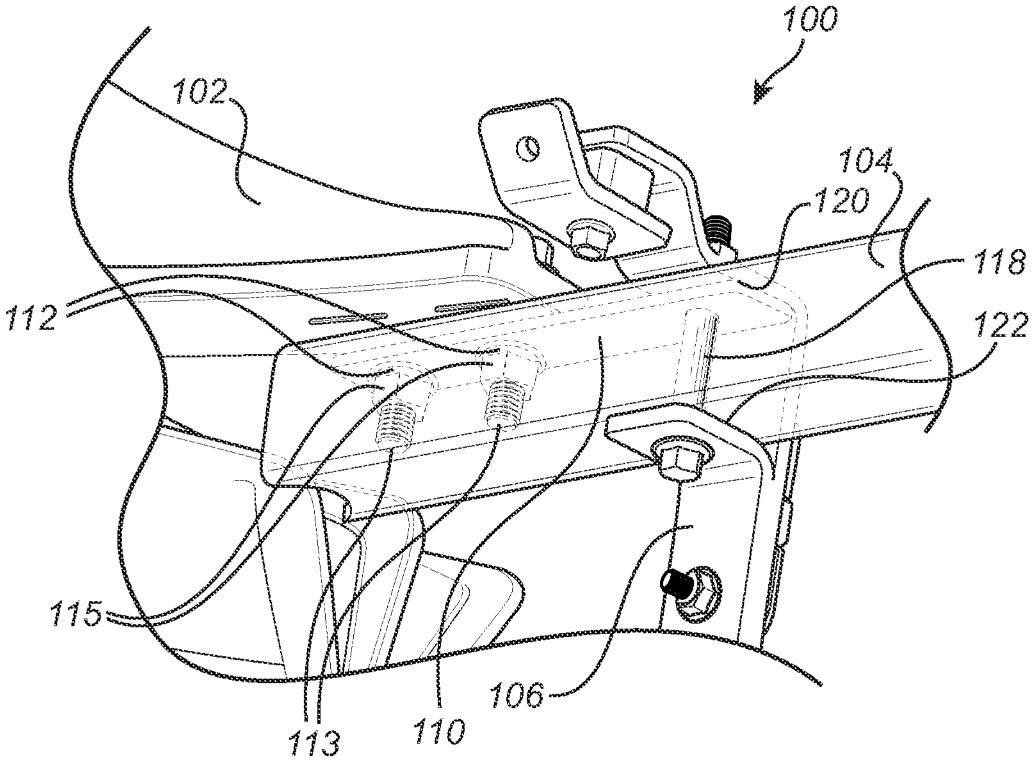

In order to describe the fender suspension arrangement 100 in yet further detail, reference is now made to FIGS. 3 and 4. It should be observed that the fender 202 is omitted from the illustrations in FIGS. 3 and 4 for simplifying for reader of the present disclosure. As can be seen in FIGS. 3 and 4, the fender suspension arrangement 100 comprises a bracket 102 connected to the frame 204 of the vehicle 10. Although not depicted in the figures, the bracket 102 is connected to the frame 204 in a conventional manner by e.g. bolts, screws, rivets or welded to the frame 204. The bracket 102 is preferably made by a high strength material, such as e.g. cast iron.

The fender suspension arrangement 100 also comprises an elongated washer element 110. As depicted in the figures, the elongated washer element 110 is arranged in abutment with the elongated tube 104. Also, the elongated washer element 110 extends between the bracket 102 and at least one of the fender brackets 106, 108. In detail, the elongated washer element 110 is connected to the bracket 102 as well as to the at least one fender bracket 106, 108. In the example depicted in FIGS. 3 and 4, the elongated washer element 110 is connected to the first fender bracket 106, i.e. the fender bracket of the pair of fender brackets positioned closest to the bracket 102. The first fender bracket 106 is thus arranged in the vicinity of the bracket 102.

Moreover, the fender suspension arrangement 100 comprises at least one bracket bolt 112. In the example depicted in FIGS. 3 and 4, the fender suspension arrangement 100 comprises a pair of bracket bolts 112. The bracket bolt 112 is arranged to fixate the elongated tube 102 as well as the elongated washer element 110 to the bracket 102. The bracket bolt(s) 112 extends through the bracket 102, the elongated washer element 110, and the elongated tube 104. The bracket bolt(s) 112 comprises a longitudinal end portion 113 positioned inside the elongated tube 104. The longitudinal end portion 113 is thus a free end portion of the bracket bolt(s) 112. In the exemplification, the longitudinal end portion 113 comprises threads for receiving a nut 115 arranged to fixate the elongated tube 102 as well as the elongated washer element 110 to the bracket 102. The bracket bolt(s) 112 can thus also be referred to as a screw and nut connection element.

Furthermore, the fender suspension arrangement 100 also comprises a fender bracket bolt 118. The fender bracket bolt 118 is in FIGS. 3 and 4 only illustrated for the first fender bracket 106 but it should be readily understood that also the second fender bracket 108 comprises such a fender bracket bolt 118, which fender bracket bolt 118 is now described in further detail. The fender bracket bolt 118 is arranged to fixate the elongated tube 102 and the elongated washer element 110 to the fender bracket 106.

The fender bracket bolt 118 is, as depicted in the figures, extending through the fender bracket 106, the elongated washer element 110 as well as through the elongated tube 102. Thus, the fender bracket bolt 118 comprises a respective longitudinal end portion, which are both arranged outside the elongated tube 102. In further detail, each of the fender brackets 106, 108 comprises two surface portions 120, 122. The two surface portions 120, 122 are arranged as a C-shaped connection arrangement for the elongated tube 104. Hence, the elongated tube 104 is connected to the C-shaped connection arrangement formed by the two surface portions 120, 122 of the fender bracket. The fender bracket bolt 118 thus extends through the two surface portions 120, 122, the elongated tube 104 as well as through the elongated washer element 110.

The fender bracket bolt 118 preferably comprises a free end portion arranged to receive a nut 119, which nut can be tightened to fixate the elongated tube 102 as well as the elongated washer element 110 to the fender bracket 106.

The elongated washer element 110 described above and depicted in FIGS. 3 and 4 is preferably arranged inside the elongated tube 104. Thus, the elongated washer element 110 is connected to the bracket 102 as well as to the fender bracket 106 via the elongated tube 104. Put it differently, the elongated tube 104 is sandwiched between the elongated washer element 110 and the bracket 102, as well as sandwiched between the elongated washer element 110 and the fender bracket 106. The elongated washer element 110 described above is thus forming a fail-safe connection for the fender arrangement 100 to prevent fender detachment during operation. In detail, if a failure, such as e.g. a crack, is formed on the elongated tube, the elongated washer element 110 will still provide a connection between the fender bracket 106 and the bracket 102, thereby preventing the fender 202 from falling to the ground.

EXAMPLE LIST

Example 1: A fender suspension arrangement (100) for suspending a fender (202) of a vehicle, the fender suspension arrangement comprising a bracket (102), connectable to a frame (204) of the vehicle, an elongated tube (104) attached to the bracket, a pair of fender brackets (106, 108) connectable to the fender of the vehicle, wherein the fender brackets (106, 108) are attached to the elongated tube (104) at a distance from each other, and an elongated washer element (110), arranged in abutment with the elongated tube (104), the elongated washer element (110) extending between, and being connected to, the bracket (102) and at least one of the fender brackets (106, 108).

Example 2. The fender suspension arrangement (100) of example 1, wherein the elongated washer element is connected to the fender bracket, of the pair of fender brackets, positioned closest to the bracket.

Example 3. The fender suspension arrangement (100) of any one of examples 1 or 2, wherein the elongated washer element is arranged inside the elongated tube and connected to the bracket and the at least one fender bracket via the elongated tube.

Example 4. The fender suspension arrangement (100) of any one of the preceding examples, wherein the fender suspension arrangement comprises at least one bracket bolt (112), the at least one bracket bolt fixating the elongated tube and the elongated washer element to the bracket.

Example 5. The fender suspension arrangement (100) of example 4, wherein the at least bracket bolt (112) extends through the bracket, the elongated washer element and the elongated tube, the at least one bracket bolt comprising a longitudinal end portion positioned inside the elongated tube.

Example 6. The fender suspension arrangement (100) of any one of examples 4 or 5, wherein the fender suspension arrangement comprises a pair of bracket bolts (112) fixating the elongated tube and the elongated washer element to the bracket.

Example 7. The fender suspension arrangement (100) of any one of the preceding examples, wherein the fender suspension arrangement comprises a fender bracket bolt (118), the fender bracket bolt fixating the elongated tube and the elongated washer element to the at least one fender bracket.

Example 8. The fender suspension arrangement (100) of example 7, wherein the fender bracket bolt extends through the at least one fender bracket, the elongated washer element and the elongated tube.

Example 9. The fender suspension arrangement (100) of any one of the preceding examples, wherein the at least one fender bracket comprises two surface portions (120, 122) arranged in abutment with the elongated tube, the two surface portions being arranged on opposite sides of the elongated tube in a direction perpendicular to the extension of the elongated tube.

Example 10. The fender suspension arrangement (100) of example 9 when dependent on example 8, wherein the fender bracket bolt extends through each of the two surface portions of the fender bracket.

Example 11. The fender suspension arrangement (100) of any one of the preceding examples, wherein the elongated tube comprises a first longitudinal end portion (124) attached to, and extends from, the bracket (102), and second longitudinal end portion (126) arranged longitudinally opposite to the first longitudinal end portion.

Example 12. The fender suspension arrangement (100) of example 11, wherein one fender bracket of the pair of fender brackets is arranged in the vicinity of the bracket, and the other fender bracket if the pair of fender brackets is arranged in the vicinity of the second longitudinal end portion.

Example 13. The fender suspension arrangement (100) of any one of the preceding examples, wherein the pair of fender brackets (106, 108) each comprises an elongated fender connection surface (128) extending from, and in a direction perpendicular to, the elongated tube, wherein each of the elongated fender connection surfaces comprises at least one connector element (130) configured to connect the fender to the fender bracket.

Example 14. The fender suspension arrangement (100) of any one of the preceding examples, wherein the elongated tube comprises a rectangular cross section.

Example 15. The fender suspension arrangement (100) of example 14, wherein the cross section is quadratic.

Example 16. The fender suspension arrangement (100) of any one of the preceding examples, wherein the bracket is formed by cast iron.

Example 17. The fender suspension arrangement (100) of any one of the preceding examples, wherein the elongated tube is made of a metallic material.

Example 18. The fender suspension arrangement (100) of any one of the preceding examples, wherein the elongated washer element is made of a metallic material.

Example 19. A fender arrangement for a vehicle, the fender arrangement comprising a fender and a fender suspension arrangement according to any one of the preceding examples, wherein the fender is attached to the pair of fender brackets.

Example 20. A vehicle, comprising a vehicle frame and a fender arrangement according to example 19, wherein the bracket is attached to the vehicle frame.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A fender suspension arrangement for suspending a fender of a vehicle, the fender suspension arrangement comprising:

- a bracket, connectable to a frame of the vehicle;
- an elongated tube attached to the bracket;
- a pair of fender brackets connectable to the fender of the vehicle, wherein the fender brackets are attached to the elongated tube at a distance from each other;
- an elongated washer element, arranged in abutment with the elongated tube, the elongated washer element extending between, and being connected to, the bracket and at least one of the fender brackets; and
- at least one bracket bolt, the at least one bracket bolt fixating the elongated tube and the elongated washer element to the bracket.

2. The fender suspension arrangement of claim 1, wherein the elongated washer element is connected to the fender bracket, of the pair of fender brackets, positioned closest to the bracket.

3. The fender suspension arrangement of claim 1, wherein the elongated washer element is arranged inside the elongated tube and connected to the bracket and the at least one fender bracket via the elongated tube.

4. The fender suspension arrangement of claim 1, wherein the at least one bracket bolt extends through the bracket, the elongated washer element and the elongated tube, the at least one bracket bolt comprising a longitudinal end portion positioned inside the elongated tube.

5. The fender suspension arrangement of claim 1, wherein the fender suspension arrangement comprises a pair of bracket bolts fixating the elongated tube and the elongated washer element to the bracket.

6. The fender suspension arrangement of claim 1, wherein the fender suspension arrangement comprises a fender bracket bolt, the fender bracket bolt fixating the elongated tube and the elongated washer element to the at least one fender bracket.

7. The fender suspension arrangement of claim 6, wherein the fender bracket bolt extends through the at least one fender bracket, the elongated washer element and the elongated tube.

8. The fender suspension arrangement of claim 6:

wherein the at least one fender bracket comprises two surface portions arranged in abutment with the elongated tube;

wherein the fender bracket bolt extends through the at least one fender bracket, the elongated washer element and the elongated tube; and wherein the fender bracket bolt extends through each of the two surface portions of the fender bracket.

9. The fender suspension arrangement of claim 1, wherein the at least one fender bracket comprises two surface portions arranged in abutment with the elongated tube, the two surface portions being arranged on opposite sides of the elongated tube in a direction perpendicular to the extension of the elongated tube.

10. The fender suspension arrangement of claim 1, wherein the elongated tube comprises a first longitudinal end portion attached to, and extends from, the bracket, and a second longitudinal end portion arranged longitudinally opposite to the first longitudinal end portion.

11. The fender suspension arrangement of claim 10, wherein one fender bracket of the pair of fender brackets is arranged in the vicinity of the bracket, and the other fender bracket of the pair of fender brackets is arranged in the vicinity of the second longitudinal end portion.

12. The fender suspension arrangement of claim 1, wherein the pair of fender brackets each comprises an elongated fender connection surface extending from, and in a direction perpendicular to, the elongated tube, wherein each of the elongated fender connection surfaces comprises at least one connector element configured to connect the fender to the fender bracket.

13. The fender suspension arrangement of claim 1, wherein the elongated tube comprises a rectangular cross section.

14. The fender suspension arrangement of claim 13, wherein the cross section is quadratic.

15. The fender suspension arrangement of claim 1, wherein the bracket is formed by cast iron.

16. The fender suspension arrangement of claim 1, wherein the elongated tube is made of a metallic material.

17. The fender suspension arrangement of claim 1, wherein the elongated washer element is made of a metallic material.

18. A fender arrangement for a vehicle, the fender arrangement comprising a fender and the fender suspension arrangement of claim 1, wherein the fender is attached to the pair of fender brackets.

19. A vehicle, comprising a vehicle frame and the fender arrangement of claim 18, wherein the bracket is attached to the vehicle frame.

* * * * *